(12) United States Patent
Hayashida et al.

(10) Patent No.: US 11,726,486 B2
(45) Date of Patent: Aug. 15, 2023

(54) AGRICULTURAL MACHINE

(71) Applicant: KUBOTA CORPORATION, Osaka (JP)

(72) Inventors: Shogo Hayashida, Sakai (JP); Susumu Umemoto, Sakai (JP); Shinnosuke Ishikawa, Sakai (JP); Junichi Yuasa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 259 days.

(21) Appl. No.: 17/115,888

(22) Filed: Dec. 9, 2020

(65) Prior Publication Data

US 2021/0191408 A1    Jun. 24, 2021

(30) Foreign Application Priority Data

Dec. 19, 2019 (JP) .................................. 2019-229521
Dec. 20, 2019 (JP) .................................. 2019-230606
Dec. 20, 2019 (JP) .................................. 2019-230607

(51) Int. Cl.
    G05D 1/02    (2020.01)
    G05D 1/00    (2006.01)

(52) U.S. Cl.
    CPC ......... G05D 1/0219 (2013.01); G05D 1/0061 (2013.01); *G05D 2201/0201* (2013.01)

(58) Field of Classification Search
    CPC ............... G05D 1/0219; G05D 1/0061; G05D 2201/0201; G05D 1/0274; G05D 1/0212;
(Continued)

(56) References Cited

U.S. PATENT DOCUMENTS 7,404,355 B2    7/2008    Viaud et al.
2006/0116798 A1*    6/2006    Gibson ................ G05D 1/0278
                                                               701/466
(Continued)

FOREIGN PATENT DOCUMENTS

EP    1 964 458 A1    9/2008
EP    3 345 799 A1    7/2018
(Continued)

OTHER PUBLICATIONS

Official Communication issued in corresponding European Patent Application No. 20213209.8, dated Sep. 3, 2021.

*Primary Examiner* — Bao Long T Nguyen
(74) *Attorney, Agent, or Firm* — Keating and Bennett, LLP

(57) ABSTRACT

An agricultural machine includes a swath information acquiring module, a first determining module to determine a traveling path of an automatic operation based on a position of a swath, a setting module to set a work continuation width based on the traveling path, a second determining module to determine, when there is a manual operation by a worker during the automatic operation, whether the agricultural machine during the manual operation is within the work continuation width, and an executing module to execute the automatic operation. The executing module restores the agricultural machine to the traveling path after a termination of the manual operation and continues the automatic operation when the agricultural machine is within the work continuation width, and cancels the automatic operation when the agricultural machine is determined to be not within the work continuation width.

10 Claims, 14 Drawing Sheets

(58) Field of Classification Search
CPC .. G05D 1/0088; G05D 1/0221; G05D 1/0276; A01B 69/001; A01B 69/008; A01D 41/1278; B60W 60/005; B60W 2300/15; B60W 2556/10
See application file for complete search history.

(56) References Cited

U.S. PATENT DOCUMENTS

| | | |
|---|---|---|
| 2008/0249692 A1 | 10/2008 | Dix |
| 2008/0269956 A1* | 10/2008 | Dix .................. G05D 1/0278 701/1 |
| 2016/0340867 A1 | 11/2016 | Matsuzaki |
| 2016/0360697 A1* | 12/2016 | Diaz .................. B60W 50/085 |
| 2018/0160619 A1 | 6/2018 | Manji et al. |
| 2019/0146513 A1 | 5/2019 | Tomita et al. |
| 2019/0323190 A1* | 10/2019 | Waelbers ............ G05D 1/0011 |
| 2020/0359543 A1* | 11/2020 | Dix .................. G05D 1/0246 |
| 2020/0359547 A1 | 11/2020 | Sakaguchi et al. |

FOREIGN PATENT DOCUMENTS

| | | |
|---|---|---|
| JP | 2018-097526 A | 6/2018 |
| JP | 2018-148857 A | 9/2018 |
| JP | 2019-054746 A | 4/2019 |
| WO | 2018/042853 A1 | 3/2018 |
| WO | 2019/111669 A1 | 6/2019 |

\* cited by examiner

AGRICULTURAL MACHINE

CROSS REFERENCE TO RELATED APPLICATIONS

This application claims the benefit of priority to Japanese Patent Application No. 2019-230606 filed Dec. 20, 2019, Japanese Patent Application No. 2019-230607 filed on Dec. 20, 2019 and Japanese Patent Application No. 2019-229521 filed on Dec. 19, 2019. The entire contents of each of these applications are hereby incorporated herein by reference.

BACKGROUND OF THE INVENTION

1. Field of the Invention

The present disclosure relates to an agricultural machine provided with an automatic steering function.

2. Description of the Related Art

A baler work is performed by connecting a baler to a tractor and towing the baler by the tractor. Although uniformity is required for bales, the shape of a swath which is a collection of mowed grass and hay, does not necessarily correspond to the size of the baler. Therefore, even if the baler simply travels on a swath, it cannot always generate uniform bales.

Thus, U.S. Pat. No. 7,404,355 discloses a tractor and a baler which generate a cylindrical bale by providing a sensor and automatically steering the tractor while acquiring the position of a swath and a bale size.

Moreover, JP2019-054746A discloses a work vehicle, such as a tractor, which performs automatic steering (auto steering) based on a scheduled traveling route. The auto steering is to automatically control steering so that a work vehicle travels a scheduled traveling route which is set in advance. Therefore, a worker can focus on operations other than driving the vehicle to improve the work efficiency.

Even if the bales are generated by the automatic steering like the conventional technology, the bales are not always uniform. In order to generate the uniform bales, a worker needs to finely adjust a traveling path, while monitoring the bale size.

However, when the worker performs a manual operation to adjust the traveling path, the automatic steering function is canceled.

SUMMARY OF THE INVENTION

Preferred embodiments of the present invention provide agricultural machines that each increase the uniformity of bales, while continuing an automatic steering function.

Moreover, if the fine adjustment continues, the execution of the automatic steering function becomes meaningless. Thus, it is desirable that the fine adjustment of a traveling path of the automatic steering function is eliminated as much as possible.

The present disclosure is made in view of the foregoing problem, and another purpose thereof is to provide an automatic steering function which allows a vehicle to travel on a traveling path as intended by a worker as much as possible.

Moreover, as described above, when a worker operates a steering wheel while the auto steering is executed, the auto steering is generally canceled.

However, if the auto steering is always canceled when the manual steering operation occurs, it may not be as intended by the worker. Meanwhile, also during the auto steering, a manual steering operation may temporarily be needed.

In such a case, it is complicated and takes too much time to again set the auto steering.

The present disclosure is made in view of the foregoing problem, and still another purpose thereof is to provide a work vehicle which can continue an auto steering as intended by a worker.

An agricultural machine according to a first aspect of an example preferred embodiment of the present disclosure has an automatic steering function that causes the agricultural machine to automatically travel on a given path. The agricultural machine includes a swath information acquiring module configured to acquire a position of a swath, a first determining module configured to determine a traveling path of an automatic operation according to the automatic steering function based on the position of the swath, a setting module configured to set a work continuation width based on the traveling path, a second determining module configured to determine, when there is a manual operation by a worker during the automatic operation, whether a position of the agricultural machine during the manual operation is within the work continuation width, and an executing module configured to execute the automatic operation according to the automatic steering function. The executing module restores the traveling of the agricultural machine on the traveling path after a termination of the manual operation and continues the automatic operation according to the automatic steering function, when the second determining module determines that the agricultural machine is within the work continuation width, and cancels the automatic steering function at a time when the second determining module determines that the agricultural machine is not within the work continuation width.

According to this configuration, even when the manual operation is performed during the automatic operation according to the automatic steering function, the automatic steering function is not canceled as long as the agricultural machine is within the work continuation width. Thus, for example when fine adjustment of a traveling path of the agricultural machine is required in order to generate uniform bales, even if a worker performs the fine adjustment of the traveling path by the manual operation, the automatic steering function is not canceled.

Therefore, the uniformity of the bales can be improved while continuing the automatic steering function.

In the agricultural machine, the executing module may restore the traveling of the agricultural machine on the traveling path via a path determined based on at least any of a current position of the agricultural machine, a traveling direction of the agricultural machine, a distance between the agricultural machine and the traveling path, a resuming distance set in advance, and an angular velocity of a steering wheel during the manual operation.

According to this configuration, since the path of restoring the traveling of the agricultural machine on the traveling path is determined based on at least any of the current position of the agricultural machine, the traveling direction of the agricultural machine, the distance between the agricultural machine and the traveling path, the resuming distance set in advance, and the angular velocity of the steering wheel during the manual operation, the agricultural machine can be caused to go back to the traveling path through an optimal path.

In the agricultural machine, the executing module may cancel the automatic steering function when an angular velocity of a steering wheel during the manual operation is a given value or more.

According to this configuration, the automatic steering function is canceled when the steering operation of which the angular velocity is the given value or more is performed during the automatic operation according to the automatic steering function. Thus, for example when a so-called "rapid steering operation" takes place, the automatic steering function can be canceled.

In the agricultural machine, the agricultural machine may be communicable with an FMIS (Farm Management Information System) that is a system in which an external device performs a centralized control of information detected by various sensors, and the swath information acquiring module may acquire, from the FMIS, the position of the swath based on information on a formation process of a target swath.

According to this configuration, since the swath information is acquired from the FMIS, the traveling path is able to be determined based on the accurate position of the swath. Moreover, for example, even when a sensor for detecting the position of the swath is not provided, the position of the swath can be recognized.

In the agricultural machine, the first determining module may determine a subsequent traveling path based on a traveling footprint on which the agricultural machine traveled on the swath by the manual operation in a certain section.

According to this configuration, since the traveling path is determined based on the traveling footprint actually traveled on the swath by the manual operation, a traveling path close to that of the manual operation can be set.

An agricultural machine according to a second aspect of an example preferred embodiment of the present disclosure is an agricultural machine including an automatic steering function that causes the agricultural machine to automatically travel on a given path. The agricultural machine includes a swath information acquiring module configured to acquire a position of a swath, a first determining module configured to determine a traveling path of an automatic operation according to the automatic steering function based on the position of the swath, an executing module configured to cause the agricultural machine to travel on the traveling path by the automatic operation according to the automatic steering function, and a traveling-footprint acquiring module configured to acquire an actually-traveled footprint in a given first section up to a current time. The first determining module determines a subsequent traveling path based on the traveling footprint acquired by the traveling-footprint acquiring module for every given second section after the automatic operation is started.

According to this configuration, since the subsequent traveling path is determined based on the traveling footprint actually traveled for the every given second section, the traveling path based on the traveling footprint actually traveled on the swath is able to be determined. Thus, the traveling path is able to be determined for the every given second section according to the actual circumstances.

For example, when a baler work is performed by the agricultural machine, the path actually traveled is highly possibly a path which is adjusted by a worker so as to make bales uniform by taking the shape, etc., of the bale into consideration. By determining the traveling path according to the actual circumstances, such an effort of the worker to generate the uniform bales is able to be reduced. In other words, the fine adjustment by the worker is able to be reduced, that is, the traveling path as intended by the worker is able to be determined.

Note that, the given second section may be the same as or longer than the given first section.

In the agricultural machine, the first determining module may determine the traveling path by machine learning using a deep learning model. The deep learning model may output the traveling footprint by using the traveling footprint and a peripheral environment state in the first section as inputs.

According to this configuration, the traveling path considered to be optimal based on the traveling footprint and the peripheral environment, is able to be determined.

In the agricultural machine, the first determining module may approximate the traveling footprint by a sine wave and determine the approximated sine-wave path as the traveling path.

The traveling footprint of the agricultural machines has a shape close to the sine wave in many cases. According to this configuration, since the traveling path is determined as the approximated sine-wave path of the traveling footprint, the traveling path close to the traveling footprint is able to be determined.

The agricultural machine may further include a setting module configured to set a work continuation width based on the traveling path, and a second determining module configured to determine, when there is a manual operation by a worker during the automatic operation, whether a position of the agricultural machine during the manual operation is within the work continuation width. The executing module may restore the agricultural machine to the traveling path after a termination of the manual operation and continue the automatic operation according to the automatic steering function, when the second determining module determines that the agricultural machine is within the work continuation width, and may cancel the automatic steering function at a time when the second determining module determines that the agricultural machine is not within the work continuation width.

According to this configuration, even when the manual operation is performed during the automatic operation according to the automatic steering function, the automatic steering function is not canceled as long as the agricultural machine is within the work continuation width. Thus, for example when the fine adjustment of the traveling path of the agricultural machine is required in order to generate uniform bales, even if the worker performs the fine adjustment of the traveling path by the manual operation, the automatic steering function is not canceled. Therefore, the uniformity of the bales is able to be improved while continuing the automatic steering function.

In the agricultural machine, the first determining module may determine the traveling path based on information used to determine the traveling path before a startup of the agricultural machine, after the startup of the agricultural machine.

According to this configuration, for example, even when the work for one day is finished and an engine, etc., of the agricultural machine is stopped, from the beginning of the work on the next day, the traveling path is able to be determined using the information on the traveling footprint of the day before, etc.

A work vehicle according to a third aspect of an example preferred embodiment of the present disclosure is a work vehicle including an automatic steering function that causes the work vehicle to automatically travel on a given path. The work vehicle includes a setting module configured to set enable and disable of the automatic steering function, an executing module configured to execute the automatic steering function when the setting module enables the automatic steering function, a determining module configured to determine whether a steering operation of the work vehicle is performed by a worker, and an interruption button configured to interrupt the automatic steering function. The executing module cancels the automatic steering function, when the determining module determines that the steering operation is performed during the execution of the automatic steering function, without the interruption button being actuated. The executing module suspends the automatic steering function, when the determining module determines that the steering operation is performed with the interruption button being actuated, and resumes the automatic steering function after the interruption button is no longer actuated.

According to this configuration, even when the steering operation is performed during the execution of the automatic steering function, as long as the interruption button is actuated, the automatic steering function is simply suspended, and after the interruption button is no longer actuated, the function is resumed. Thus, it can suitably support a case when the worker wants to perform the steering operation without canceling the automatic steering function. That is, the automatic steering is able to be continued as intended or desired by the worker.

In the work vehicle, the executing module may derive an optimal path to restore the work vehicle to the given path based on a position of the work vehicle at a timing when resuming the automatic steering function, and the given path. The executing module may then cause the work vehicle to travel on the optimal path and to return to the given path.

According to this configuration, when the automatic steering function is resumed, the work vehicle can be returned to the given path through an optimal path.

In the work vehicle, the interruption button may be provided to a steering wheel.

According to this configuration, the worker can actuate interruption button while operating the steering wheel, and thus the actuation of the interruption button can be easier.

In the work vehicle, a steering wheel may be provided with a steering wheel spinner, and the interruption button may be provided to the steering wheel spinner.

According to this configuration, since the interruption button is provided to the steering wheel spinner, the interruption button is actuated while the rotation of the steering wheel is easily controlled, and thus the actuation of the interruption button can be easier.

In the work vehicle, the interruption button may be provided to an arm rest inside a cabin of the work vehicle.

According to this configuration, the worker can easily actuate interruption button.

The baler controllers according to various aspects of example preferred embodiments of the present disclosure described above, may be implemented by a computer, and in this case, a control program which operates the computer as the baler controller (software) to achieve the baler controller by the computer, and a computer readable recording medium which stores the program are encompassed in the scope of the present disclosure.

According to the first aspect of an example preferred embodiment of the present disclosure, even when the manual operation is performed during the automatic operation according to the automatic steering function, the automatic steering function is not canceled as long as the agricultural machine is within the work continuation width.

Thus, for example when fine adjustment of a traveling path of the agricultural machine is required in order to generate uniform bales, even if a worker performs the fine adjustment of the traveling path by the manual operation, the automatic steering function is not canceled. Therefore, the uniformity of the bales is able to be improved while continuing the automatic steering function.

According to the second aspect of an example preferred embodiment of the present disclosure, since the subsequent traveling path is determined based on the traveling footprint actually traveled for the every given second section, the traveling path based on the traveling footprint actually traveled on the swath is able to be determined. Thus, the traveling path is able to be determined for every given second section according to the actual circumstances. Moreover, by determining the traveling path according to the actual circumstances, the effort of the worker to generate the uniform bales is able to be reduced. In other words, the fine adjustment by the worker is able to be reduced, that is, the traveling path as intended by the worker is able to be determined.

According to the third aspect of an example preferred embodiment of the present disclosure, even when the steering operation is performed during the execution of the automatic steering function, as long as the interruption button is actuated, the automatic steering function is simply suspended, and after the interruption button is no longer actuated, the function is resumed. Thus, it is able to suitably support a case when the worker wants to perform the steering operation without canceling the automatic steering function. That is, the automatic steering is able to be continued as intended by the worker.

The functions of the work vehicles according to various example preferred embodiments of the present disclosure may be implemented by a computer, and in this case, a control program which operates the computer as each module (software) provided to the work vehicle to achieve the function of the work vehicle by the computer, and a computer readable recording medium which stores the program are encompassed in the scope of the present disclosure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, example preferred embodiments of the present disclosure is described in detail. In an example preferred embodiment, a tractor 10 is connected to a baler 20 so that it is able to tow the baler 20. The tractor 10 and the baler 20 are able to communicate with each other. A baler work is performed by the tractor 10 traveling while it tows the baler 20. Here, the tractor 10 and the baler 20 are comprehensively referred to as an "agricultural machine 30."

In this preferred embodiment, the tractor 10 includes an automatic steering function. The tractor 10 is provided with a measuring sensor 16 to measure the position and shape of a swath, and determines a traveling path on which the automatic steering function causes the tractor 10 to travel automatically, and therefore, the tractor 10 travels on the traveling path. Further, a work continuation width or swath is set to the determined traveling path, and if the tractor 10 exists within the work continuation width, the tractor 10 does not cancel the automatic steering even if a manual operation is performed during the automatic steering, and continues the automatic steering after the manual operation.

Thus, the tractor 10 can travel by the automatic steering, and even if the manual operation is performed in order to finely adjust the traveling path of the tractor 10, the automatic steering can be continued after the manual operation. Therefore, the troubles (the time and effort, processing, etc.) which are caused by canceling the automatic steering is able to be reduced.

Figure 2:
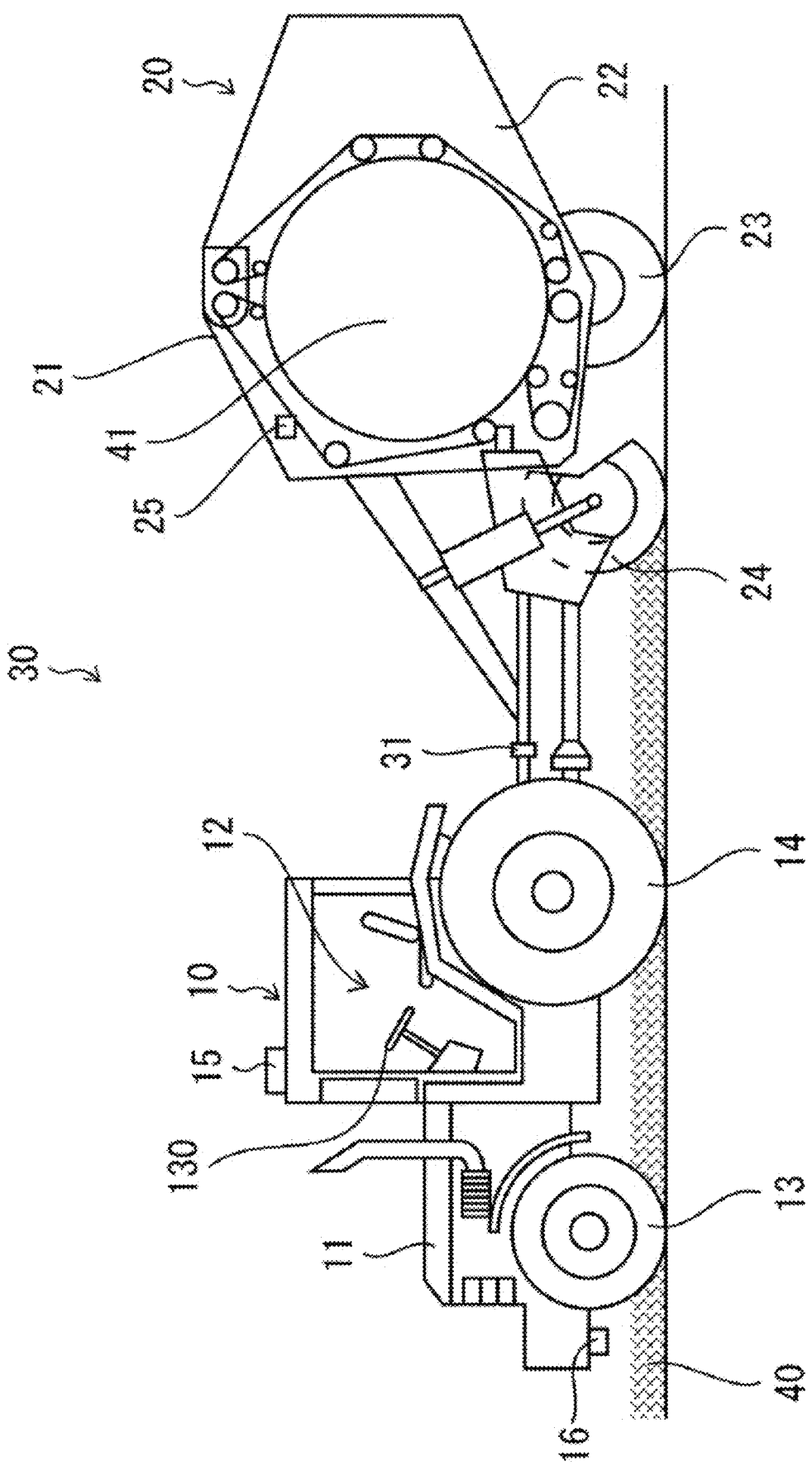
FIG. 2 is a view schematically illustrating the tractor and the baler.

Referring to FIG. 2, the tractor 10 which is a traveling vehicle is described. FIG. 2 is a side view of the tractor 10 and the baler 20. The tractor 10 includes a vehicle body 11, a cabin 12 surrounded by the vehicle body 11, front wheels 13 and rear wheels 14 which are propelled by power from an engine and/or a motor (not illustrated). The tractor 10 can slowdown and stop by using a brake (not illustrated).

The tractor 10 is provided with a GPS 15 and can acquire positional information from satellites. The tractor 10 can perform the automatic steering by using the positional information, and can also automatically travel on a swath 40. The GPS 15 may be provided with an inertial measurement unit (IMU). The positioning accuracy of the GPS can be supplemented by the inertial measurement unit. Moreover, since the inertial measurement unit can measure the angles of three axes, it can measure a vehicle posture of the tractor 10 on irregularities, a sloping ground, etc. of a field. The tractor 10 may also be provided with a measuring sensor 16, such as a lidar and a camera. The tractor 10 may also detect the swath by the measuring sensor 16, and automatically travel on the swath 40.

Moreover, the baler 20 includes a frame 21, a rear gate 22, and traveling wheels 23. The baler 20 is connected physically and electrically with the tractor 10 via a connector 31. The baler 20 is towed by the tractor 10 and forms a bale 41.

The baler 20 feeds hay, straw, etc. which are mowed grass, wheat, etc. in the swath 40 from an inlet port 24 into an internal space surrounded by the frame 21 and the rear gate 22, and forms the bale 41. A baler sensor 25 is located in the internal space surrounded by the frame 21 and the rear gate 22, and detects the size of the bale 41. When the bale 41 grows to a given size, the tractor 10 stops, and the bale 41 is packed and discharged from the baler 20.

Figure 1:
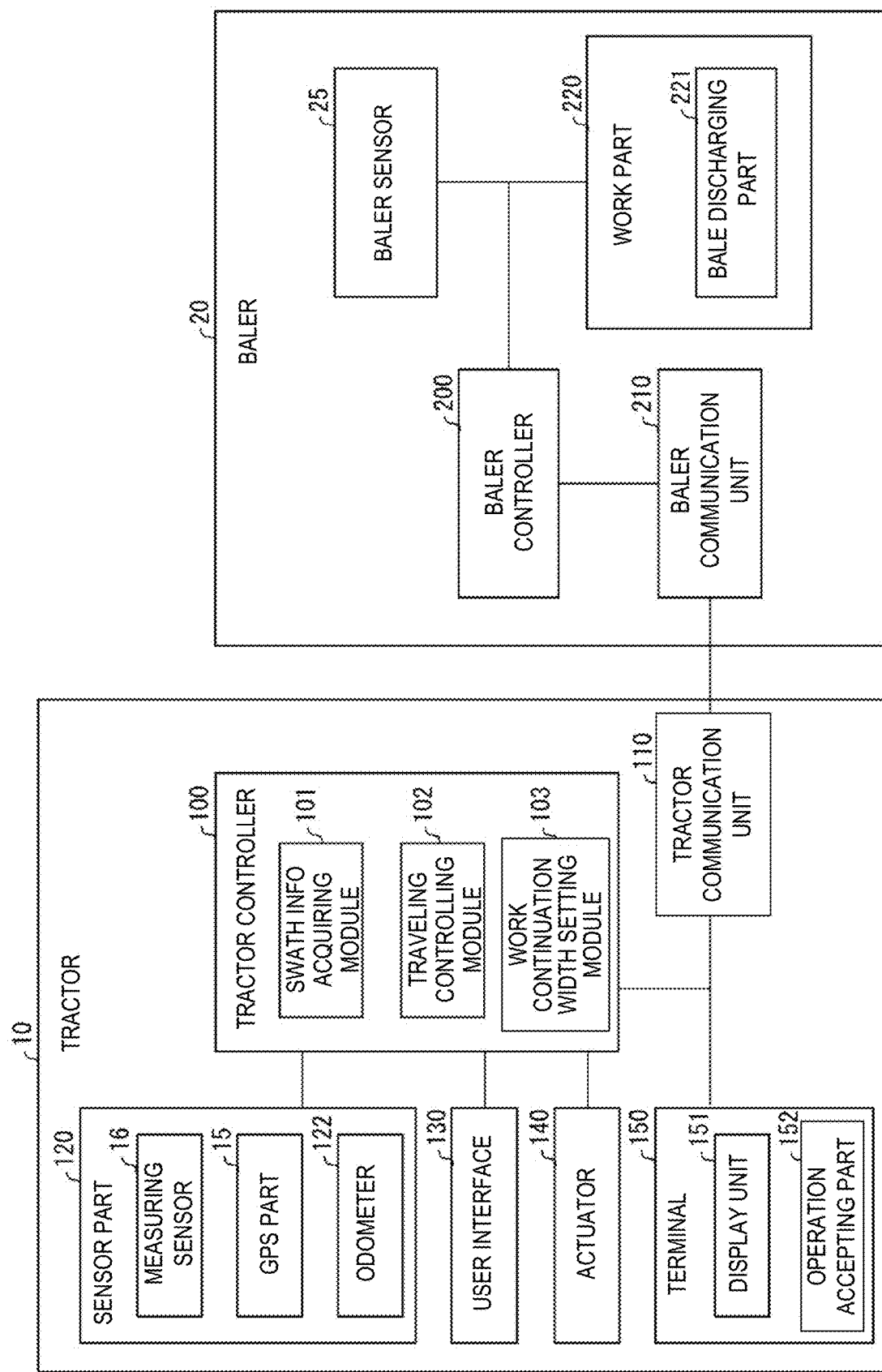
FIG. 1 is a functional block diagram illustrating a structure of a tractor and a baler according to an example preferred embodiment of the present invention.

Next, functions of the tractor 10 and the baler 20 are described with reference to FIG. 1. FIG. 1 is a functional block diagram of the tractor 10 and the baler 20.

As illustrated in FIG. 1, the tractor 10 includes a tractor controller 100, a tractor communication unit 110, a sensor 120, a user interface 130, an actuator 140, and a terminal 150. These components are connected to each other according to the International Standard ISO11783 based on CAN (Control Area Network), which is referred to as ISOBUS.

The tractor controller 100 includes an ECU (Electronic Control Unit), and a CPU (Control Processing Unit), a memory, a control software, etc. The tractor controller 100 performs a control related to traveling of the tractor 10 (e.g., traveling and stop), PTO (Power Take-Off) which transmits the power from the engine to a work machine, such as the baler 20, and a control of a hitch which attaches the work machine to the tractor.

The tractor controller 100 includes a swath information acquiring module 101, a traveling controlling module (a first determining module, a second determining module, an executing module) 102, and a work continuation width setting module (a setting module) 103. The swath information acquiring module 101 acquires swath information measured by the measuring sensor 16 (the position, the shape, etc.), and notifies it to the traveling controlling module 102.

The traveling controlling module 102 is to perform the automatic steering function, and determines a suitable traveling path based on the swath information notified from the swath information acquiring module 101, and the shape of the bale 41 notified from the baler 20, and controls the actuator 140 so that the tractor 10 travels on the determined traveling path.

The work continuation width setting module 103 sets the work continuation width during the execution of the automatic steering function. The work continuation width is a given width corresponding to a distance from the center line of the traveling path set in order to perform the automatic steering function. The given distance is determined based on the width of the swath 40, the size of the bale generated by the baler 20, the width of the tractor 10, etc., and if the tractor 10 exists within the work continuation width, the automatic steering function will not be canceled.

The sensor 120 includes the GPS 15, the measuring sensor 16, and an odometer 122, in addition to sensors to sense fundamental parameters of the tractor, such as a vehicle speed, a transmission status, an engine speed, a PTO rotational speed, a work machine attaching status, and a hydraulic pressure. The information acquired by the sensor 120 is sent to the tractor controller 100 and is used to control the tractor 10.

The user interface 130 is a steering wheel and pedals of an accelerator and a brake, and allows an operator to perform an operation related to traveling of the tractor 10.

The actuator 140 includes power sources, such as the engine and the motor, the transmission, a clutch axle, the brake, the front wheels 13, the rear wheels 14, and the PTO and the hitch which drive the work machine. Note that the brake may be an electronic brake. The actuator 140 is controlled by the tractor controller 100.

The terminal 150 includes a display unit 151 and an operation accepting part 152. The terminal 150 includes, for example, a touch panel, and it is able to display the information acquired from the sensors of the tractor 10 and the baler 20 and to be used to accept an operation related to the work of the baler 20, and accept settings for the PTO and the hitch of the tractor 10.

The tractor communication unit 110 performs two-way communications (intercommunications) with the baler 20. Here, communications based on the International Standard ISO11783 is used. The tractor communication unit 110 also has a TIM (Tractor Implement Management) system so that it receives a control signal from the baler 20 and the tractor controller 100 performs controls of the speed of the tractor 10, the rotational speed of the PTO, the height of the hitch, the hydraulic pressure, etc. Note that the terminal 150 may be connected to the baler 20 without through the tractor communication unit 110. Moreover, the terminal 150 is also connected to the tractor controller 100.

As illustrated in FIG. 1, the baler 20 includes a baler controller 200, a baler communication unit 210, the baler sensor 25, and a work part 220. These are connected with each other through the ISOBUS.

The baler controller 200 includes an ECU (Electronic Control Unit), and a CPU (Control Processing Unit), a memory, a control software, etc. The baler controller 200 performs a control to compress hay and straw and to form the bale having a given size and shape.

There are mainly two types of balers 20 which form a cylindrical bale 41 (referred to as a "round baler") and which form a square bale 41 (referred to as a "square baler"). The shape of the bale 41 can be determined by [longitudinal dimension (length)]×[lateral dimension (width)]×[height], when a traveling direction of the baler 20 is the longitudinal direction (length direction), a direction perpendicular to the traveling direction of the baler 20 is the lateral or transverse direction (width direction), and a height direction of the baler 20 is the height direction. As one example, the square-shaped bale 41 has 200 cm (length)×80 cm (width)×90 cm (height), and the round bale 41 has 120 cm (width)×150 cm (diameter: length and height). For example, as for the round baler, hay and straw are uniformly distributed in the width direction, the bale 41 is grown without an eccentricity in the thickness in the width direction, and when the bale 41 reaches a target size (diameter), the work is stopped.

The baler controller 200 transmits necessary information, such as the current size and shape of the bale 41, or a speed-control request, such as a slowdown (if needed) to the tractor 10 through the baler communication unit 210. The information or request is displayed on the terminal 150 of the tractor 10. Here, the width of the bale 41 is normally not in agreement with the width of the swath 40, and even if it is in agreement, the density of the swath 40 is rarely constant in the width direction, and the swath 40 has a mountain shape. Therefore, if the bale is not uniform in the transverse direction (width direction), the baler controller 200 transmits the information to the tractor 10, and the information is displayed on the terminal 150.

Even during the automatic steering operation, the worker finely adjusts the traveling path of the tractor 10 based on the information, and, for example, steers so that the tractor 10 travels offset from the center of the swath 40 so as to make the bale 41 uniform. Moreover, the worker may also steer so that the tractor 10 travels in a zigzag manner with respect to the swath 40 to make the bale 41 uniform.

The baler sensor 25 measures, for example, the size, shape, weight, and the uniformity of the surface of the bale 41. The information acquired by the baler sensor 25 is sent to the baler controller 200 and is used for the control. In this preferred embodiment, for example, a plurality of bale size sensors are lined up in the transverse direction and define and function as the baler sensor 25, and measure the size of the bale 41 and the uniformity in the width direction.

The work part 220 creates the bale 41. As described above, the work part 220 compresses hay, straw, etc. entered from the inlet port 24, and shapes them to form the bale 41. Moreover, after the bale is created, the work part 220 packs the bale 41 and discharges it from a bale discharging part 221. Note that the discharge of the bale 41 is performed by opening the rear gate 22.

The baler communication unit 210 performs the two-way communication with the tractor 10 by the communication based on the ISO11783, and sends the necessary information to the tractor 10. The baler communication unit 210 also sends the request for the speed control as needed.

Figure 3:
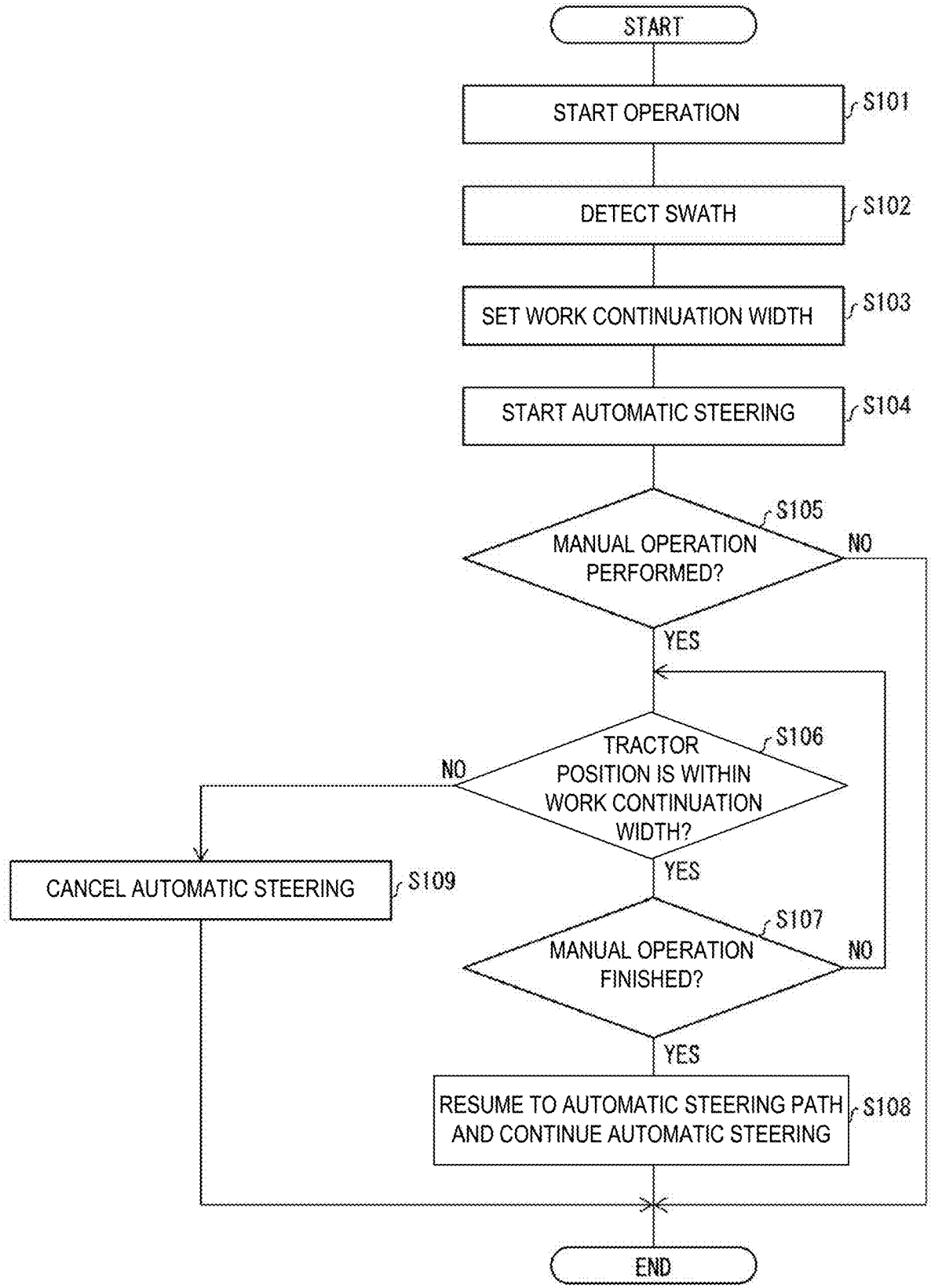
FIG. 3 is a flowchart illustrating a flow of processing in the tractor.

Next, a flow of processing in the tractor 10 is described with reference to FIG. 3. FIG. 3 is a flowchart illustrating the flow of processing in the tractor 10.

As illustrated in FIG. 3, when the operation of the tractor 10 is started (S101) and a start setting of the automatic steering operation is performed, the measuring sensor 16 detects the swath 40 (S102), and the work continuation width setting module 103 sets a work continuation width (S103). Then, the automatic steering operation is started (S104).

When a manual operation (steering operation) is performed during the automatic steering operation (YES at S105), the traveling controlling module 102 determines whether the position of the tractor 10 is within in the work continuation width (S106). The determination of whether the tractor 10 is located within the work continuation width is performed based on the position of the tractor 10 obtained by the GPS 15 described above. Then, if determined that the tractor 10 is within the work continuation width (YES at S106), the automatic steering is suspended, and the tractor 10 travels based on the manual operation of the worker. Then, when the manual operation of the worker is finished (YES at S107), the traveling controlling module 102 steers the tractor 10 so that the tractor 10 is restored to or returns to the preset traveling path, and continues the automatic steering operation (S108).

The determination of the manual operation being finished can be made, for example, when the worker releases his/her hand(s) from the steering wheel, when there has not been steering operation for a given period of time, and when there is an input indicating that the manual operation is finished into a switch. Note that the determination of whether the worker released the hand from the steering wheel can be made by attaching a sensor to the steering wheel.

Moreover, a path for returning to the traveling path may be determined, for example, based on a relation between the traveling direction of the tractor 10 and the traveling path, a distance between the position of the tractor 10 and the traveling path when the manual operation is finished, a setting of a path length for returning to the traveling path, and an angular velocity (an angle and a time) of the steering operation in the manual operation.

Here, a case is considered where the manual operation is performed because there is an obstacle. In this case, if the worker could avoid the obstacle without significantly steering the steering wheel, the tractor 10 and the baler 20 are possible to return to the scheduled path by the shortest route. On the other hand, if the steering wheel is steered significantly and the tractor 10 and the baler 20 are returned by the shortest route, they may roll over. Especially, since the baler 20 becomes heavier when the size of the bale 41 increases, the steering needs to be performed carefully. Thus, in such a case, the tractor 10 and the baler 20 return at a steering angle at which they will not roll over to the path on which the tractor 10 and the baler 20 were originally scheduled to travel by the auto steer. The convergence sensibility of such a return may be set using the terminal 150, or it may be changed according to the size of the bale 41.

On the other hand, at Step S105, if there is no manual operation (NO at S105), the automatic steering operation is continued as it is. Moreover, if the tractor 10 exits the work continuation width at Step S106 (NO at S106), the traveling controlling module 102 cancels the automatic steering operation (S109).

Figure 4:
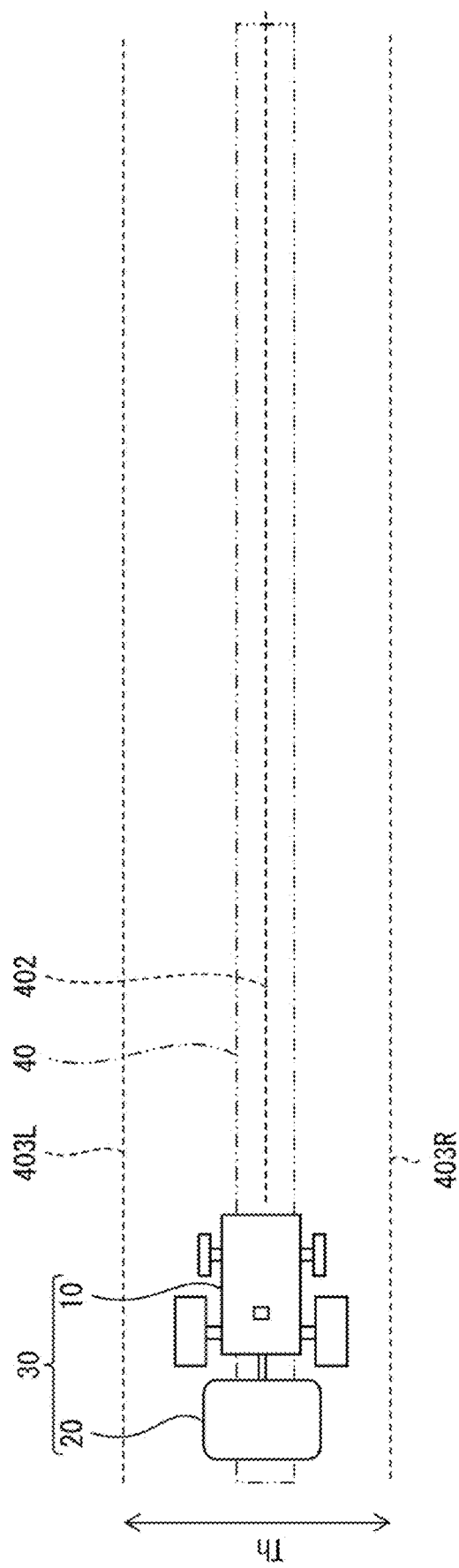
FIG. 4 is a view illustrating a continuation of an automatic steering operation.
Figure 5:
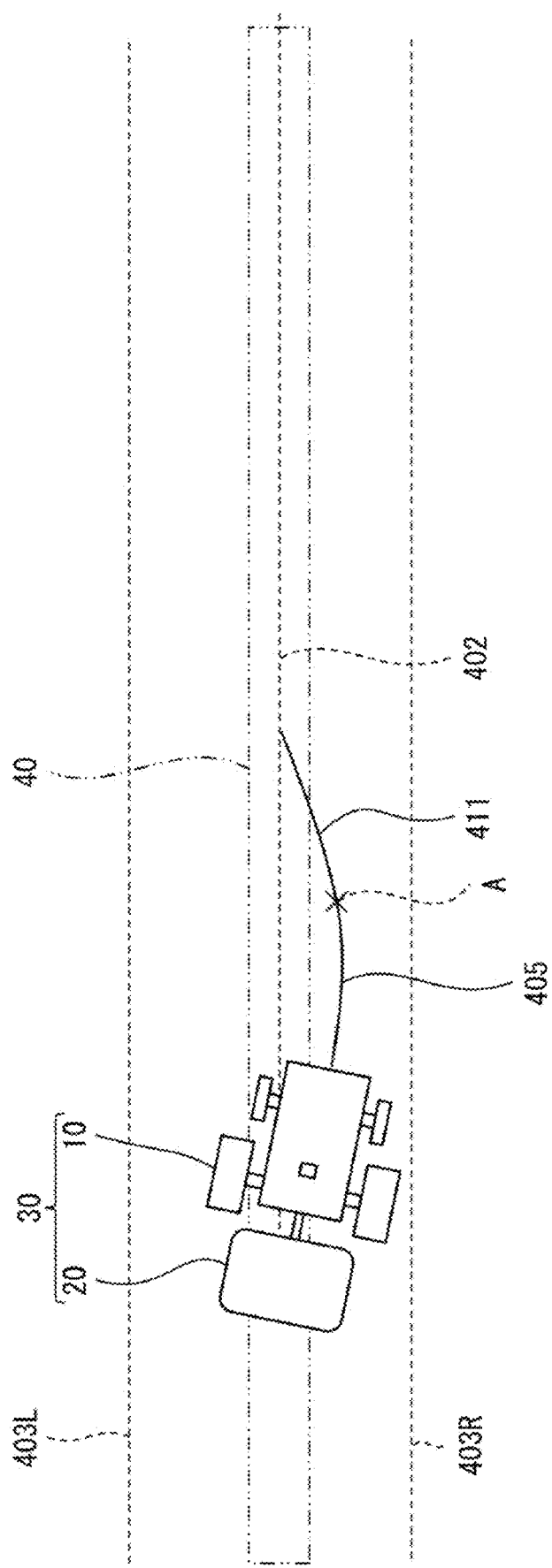
FIG. 5 is a view illustrating a continuation of the automatic steering operation.

Next, a continuation of the automatic steering operation is described with reference to FIGS. 4 and 5. FIGS. 4 and 5 are views illustrating the continuation of the automatic steering operation. As described above, in this preferred embodiment, when the tractor 10 exists within the work continuation width, it does not cancel the automatic steering operation even if there is a manual operation.

For example, as illustrated in FIG. 4, considering a case where a traveling path 402 of the automatic steering operation is set with respect to the swath 40, and the work continuation width 403 (403L, 403R) is set with a width Th. In this case, if the worker operates nothing, the tractor 10 travels along the traveling path 402. Here, as illustrated in FIG. 5, assuming that the worker operates the steering wheel so that the tractor 10 deviates to the right from the traveling path 402 and travels on a traveling path 405. Then, assuming that the worker finishes the steering operation (manual operation) at Point A. In this case, since the tractor 10 exists within the work continuation width 403 during a period from the start to the end (Point A) of the manual operation, the automatic steering operation is not canceled. Then, since the manual operation is canceled at Point A, the traveling controlling module 102 controls the tractor 10 to travel so that the tractor 10 returns to the traveling path 402 along an optimal path from Point A. Then, when the tractor 10 returns to the traveling path 402, the traveling controlling module 102 continues the automatic steering operation.

Modification 1

In the above preferred embodiment, when the tractor 10 exists within the work continuation width 403, the automatic steering operation is not canceled. However, for example, if a so-called "rapid steering operation" takes place, the automatic steering operation may be canceled even if the tractor 10 exists within the work continuation width 403.

That is, if an amount of steering operation exceeds a threshold within a given period of time, the automatic steering operation is canceled because of the "rapid steering operation." When there is a "rapid steering operation," an unexpected situation may be occurring, such as an obstacle or a person being appeared. In this modification, since the automatic steering operation is canceled in such a situation, the safety measure is improved.

Modification 2

The swath information acquiring module 101 may acquire the swath position from an FMIS (Farm Management Information System). The FMIS is a system which performs a centralized management of information detected by various sensors. If information related to the swath formed by collecting the mowed hay, grass, etc. is managed by the FMIS before the bale work, the tractor 10 communicates with the FMIS to acquire the information and recognizes the swath position.

Modification 3

The traveling controlling module 102 may acquire a traveling footprint when the tractor 10 travels on a swath for a certain distance by the manual operation, and may set the subsequent traveling path based on the traveling footprint. By using the traveling footprint obtained by actually traveling on the swath, a traveling path close to that of the manual operation can be set.

Note that, when the shape of the bale 41 is adjusted by using such a manual operation, the baler sensor 25 may measure the shape of the bale 41, and the baler controller 200 or the tractor controller 100 may perform a machine learning to utilize the measured shape for the future automatic steering.

Preferred Embodiment 2

In Preferred Embodiment 1 described above, the traveling controlling module 102 determines the traveling path based on the swath detected by the measuring sensor 16. In this preferred embodiment, in addition to that, the traveling controlling module 102 determines the subsequent traveling path based on the traveling footprint of the past. Note that, here, an actually-traveled path is referred to as the "traveling footprint," and a scheduled-traveling path is referred to as the "traveling path."

Figure 6:
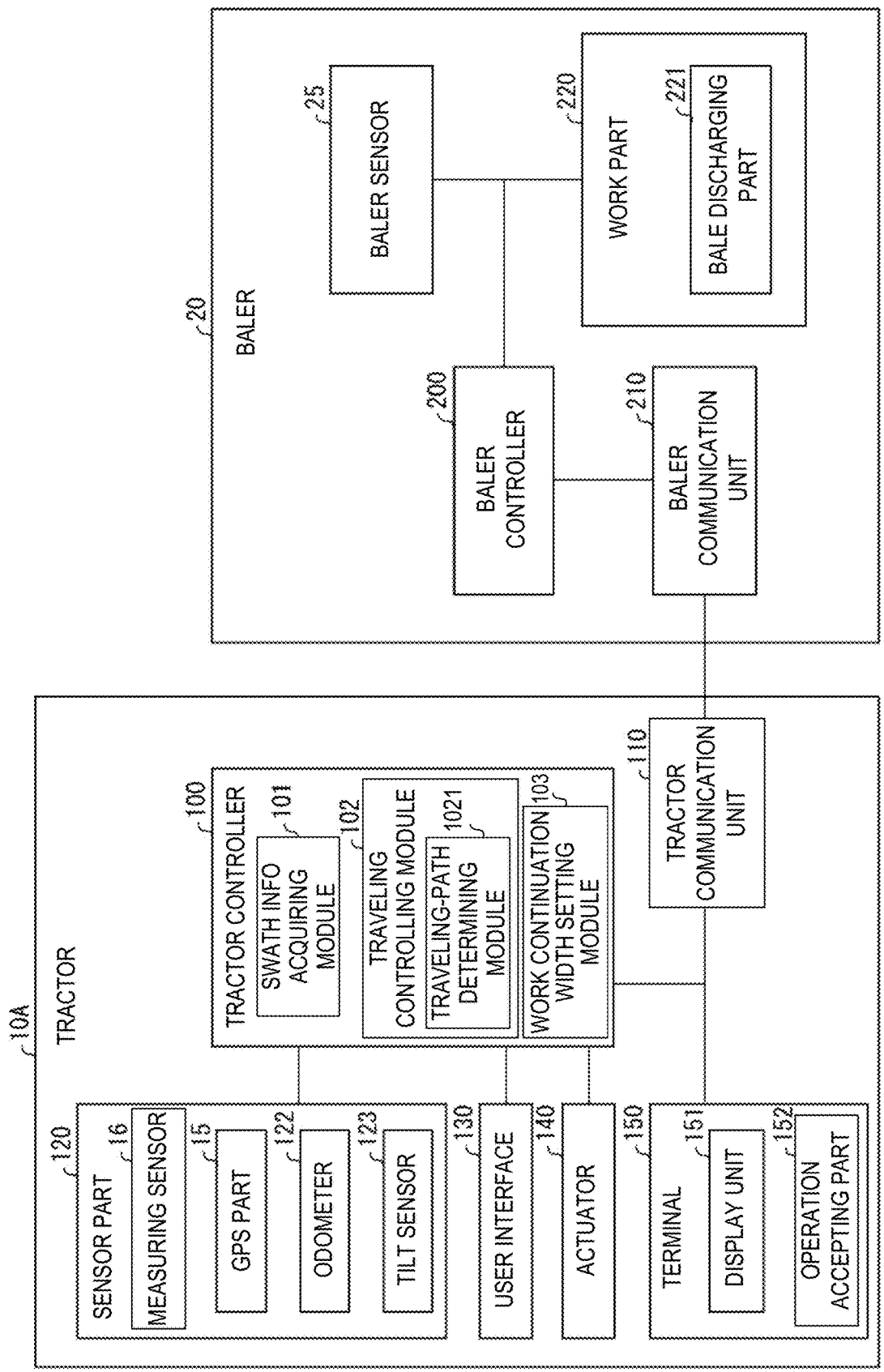
FIG. 6 is a functional block diagram illustrating a structure of a tractor according to another preferred embodiment of the present invention.

First, FIG. 6 illustrates a functional block diagram of a tractor 10A in this preferred embodiment. As illustrated in FIG. 6, the tractor 10A in this preferred embodiment includes a tilt sensor 123 in the sensor 120, and a traveling-path determining module (traveling-footprint acquiring module) 1021 in the traveling controlling module 102, as compared with the tractor 10 in Preferred Embodiment 1 described above.

The traveling-path determining module 1021 of the traveling controlling module 102 approximates, each time the tractor 10A travels a given section (given second section), the traveling footprint of the tractor 10A in a previous section (given first section) up to the current time by a sine wave when seen from the sky, and determines the sine-wave path when seen from the sky as the subsequent traveling path.

Figure 7:
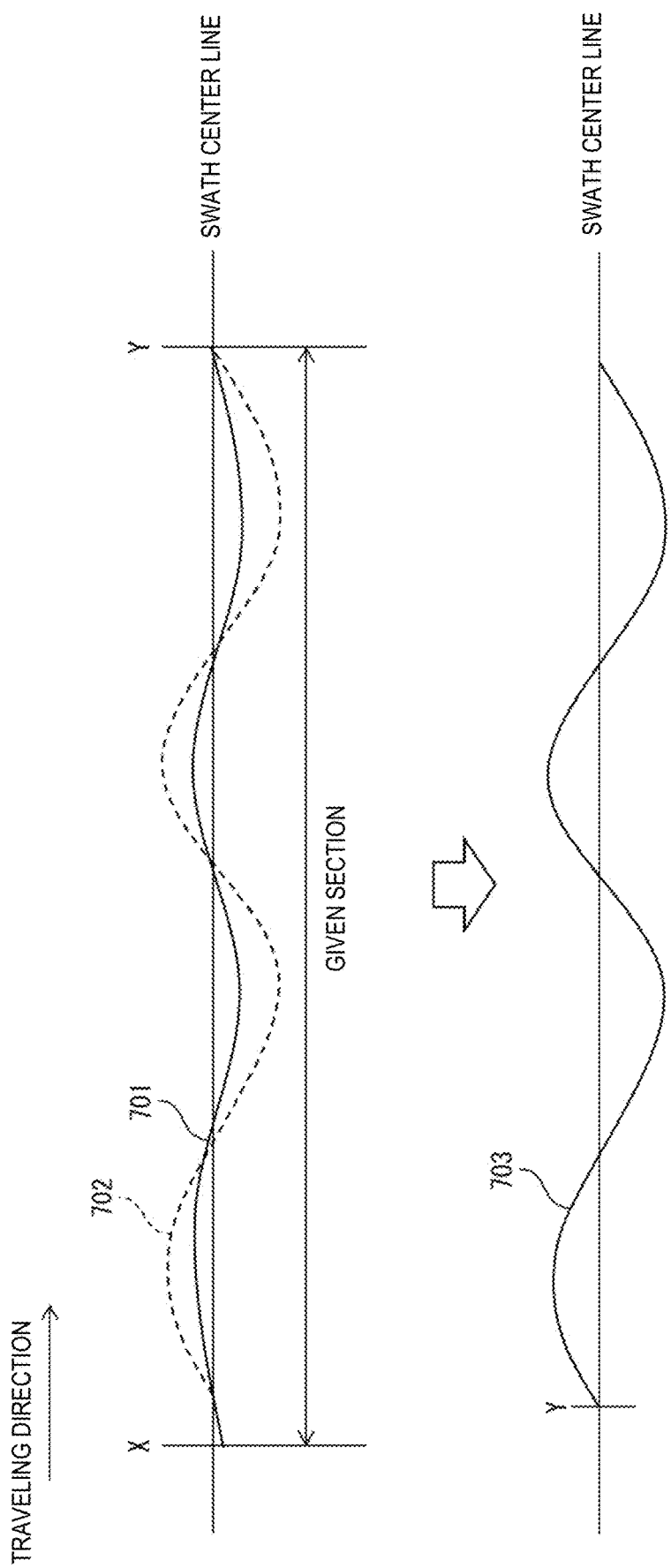
FIG. 7 is a view illustrating one example of a method of determining a traveling path by a traveling controlling module.

Referring to FIG. 7, this path is described concretely. FIG. 7 is a view illustrating one example of a method of determining the traveling path by the traveling controlling module 102. In FIG. 7, the tractor 10A travels from the left to the right. When the tractor 10A travels from Point X to Point Y, and when the traveling-path determining module 1021 determines at Point Y the traveling path after Point Y, it determines the subsequent traveling path based on the actually-traveled footprint in the given section X-Y (given first section). That is, in the given section X-Y, when the traveling path determined by the traveling-path determining module 1021 is a path 701, and the traveling footprint on which the tractor 10A actually traveled by a manual operation of the worker is a footprint 702, the traveling-path determining module 1021 approximates, by a sine wave, the footprint 702 by using a difference (offset amount) between the footprint 702 and a swath center line, and determines the path indicated by the approximated sine wave as a future traveling path 703.

Thus, since the future traveling path is able to be determined based on the latest actually-traveled footprint, the traveling path conforms more with the actual situation. Here, the swath center line is a line along the center of the swath in the traveling direction.

Note that the traveling footprint may be acquired based on the position of the tractor 10A detected by the GPS 15, or may be calculated based on the steered amount of the steering wheel of the user interface 130, the traveling speed of the tractor 10A, etc.

Figure 8:
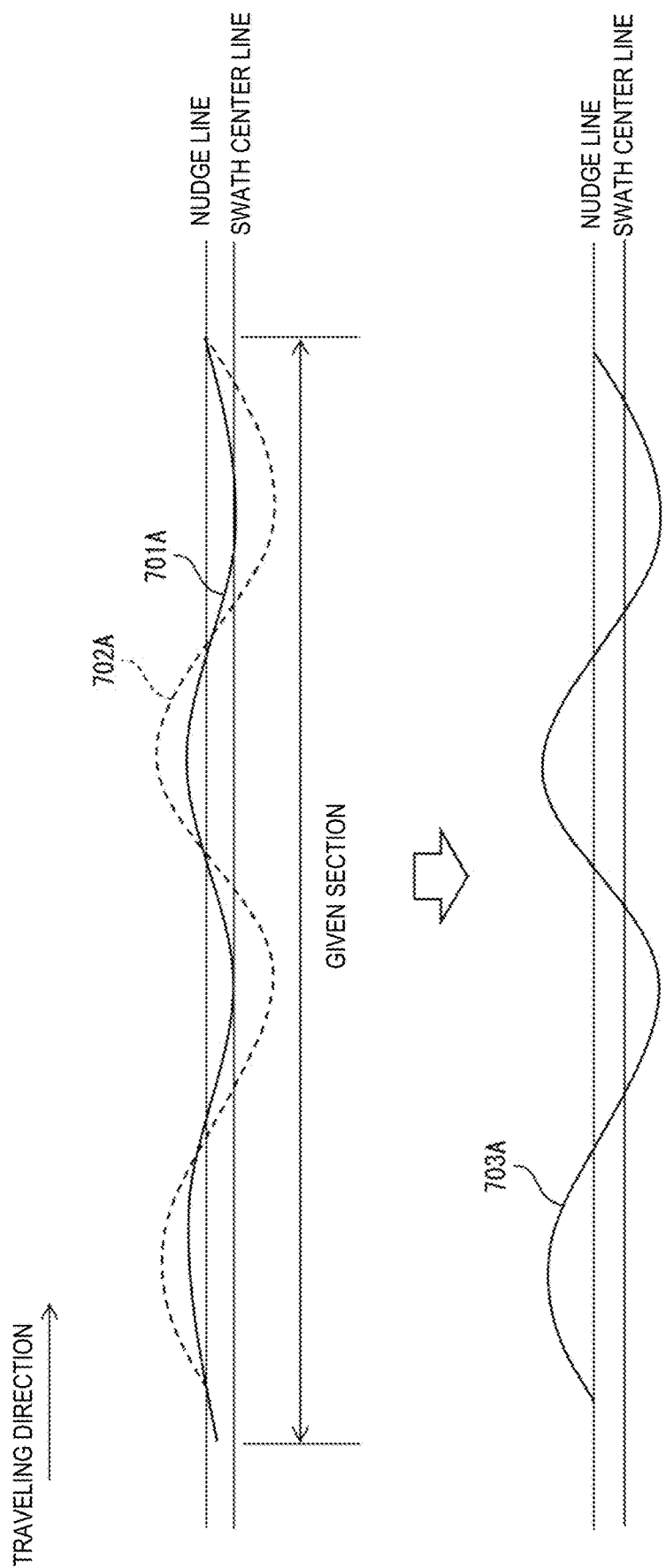
FIG. 8 is a view illustrating one example of the method of determining the traveling path by the traveling controlling module when a nudge function is provided.

Alternatively, when the tractor 10A travels, by a so-called "nudge function," on a line offset to the left or the right from the swath center line (hereinafter, also referred to as the "nudge line") as a guide line, the traveling-path determining module 1021 may use a path indicated by a sine wave with respect to the nudge line as the traveling path. For example, as illustrated in FIG. 8, when the nudge line exists on the left side of the swath center line in the traveling direction, and a traveling path 701A and a traveling footprint 702A exist on the basis of the nudge line, the traveling-path determining module 1021 may determine a path indicated by a sine wave using the nudge line as the center line (i.e., a sine wave offset to left side from the swath center line) as a traveling path 703A.

Modification 4

The traveling-path determining module 1021 may determine the traveling path by performing machine learning using a deep learning model which is a kind of AI (Artificial Intelligence). That is, the traveling-path determining module 1021 may determine the traveling path by performing the machine learning by using information indicative of states of peripheral environment, such as various sensor values acquired by the sensor, the swath position, and the bale shape, and the actually-traveled path, as learning data.

Therefore, a more appropriate traveling path conforming with the actual situation is able to be determined.

Modification 5

The traveling-path determining module 1021 may determine the traveling path based on the sensor value detected by the tilt sensor 123. In a sloping ground, a difference may occur in the traveling footprint between the tractor 10A and the baler 20. Thus, by determining the traveling path based on the detection value of the tilt sensor 123, the traveling path is able to be determined in consideration of the difference in the traveling footprint between the tractor 10A and the baler 20.

Modification 6

The traveling path determined by the traveling-path determining module 1021 may be displayed on the display unit 151 of the terminal 150. By displaying it on the display unit 151, the worker can clearly recognize the traveling path.

Moreover, the traveling path may be displayed along with the swath position etc. Therefore, the worker can recognize a relation between the traveling path and the swath position.

Modification 7

The information used to determine the traveling path may be stored in the tractor controller 100 even after a key of the tractor 10A is turned off (e.g., after the engine is stopped). Therefore, when a work is again performed using the tractor 10A, the traveling path is able to be determined using the previous information.

Moreover, in the method of determining the traveling path by using the machine learning, the machine-learned contents may be stored in the tractor controller 100 even after the key of the tractor 10A is turned off. Therefore, when the work is again performed using the tractor 10A, the traveling path is able to be determined based on the previously learned contents.

The control block of the tractors 10 and 10A and the baler 20 (particularly, the tractor controller 100, the baler controller 200) may be implemented, for example, by a logic circuit (hardware) embodied in an integrated circuit (IC chip) or may be implemented by software, for example.

In the latter case, the tractors 10 and 10A and the baler are provided with a computer which executes a command of a program which is software which achieves the functions. For example, the computer is provided with at least one processor (control device) and at least one computer-readable recording medium which stores the program described above. By the processor of the computer reading and executing the program from the recording medium, the purpose of the present disclosure is achieved. For example, a CPU (Central Processing Unit) may be used as the processor. For example, as the recording medium, "non-transitory tangible medium" such as a ROM (Read Only Memory), a tape, a disc, a card, a semiconductor memory, and a programmable logic circuit, may be used. In addition, a RAM (Random Access Memory) which develops the program may also be provided. Moreover, the program may be supplied to the computer via an arbitrary transmission medium (a communication network, a broadcast wave, etc.) which can transmit the program. Note that one mode of the present disclosure may also be implemented as a form of data signal embedded in a carrier wave, where the program is implemented by an electronic transmission.

Preferred Embodiment 3

Figure 9:
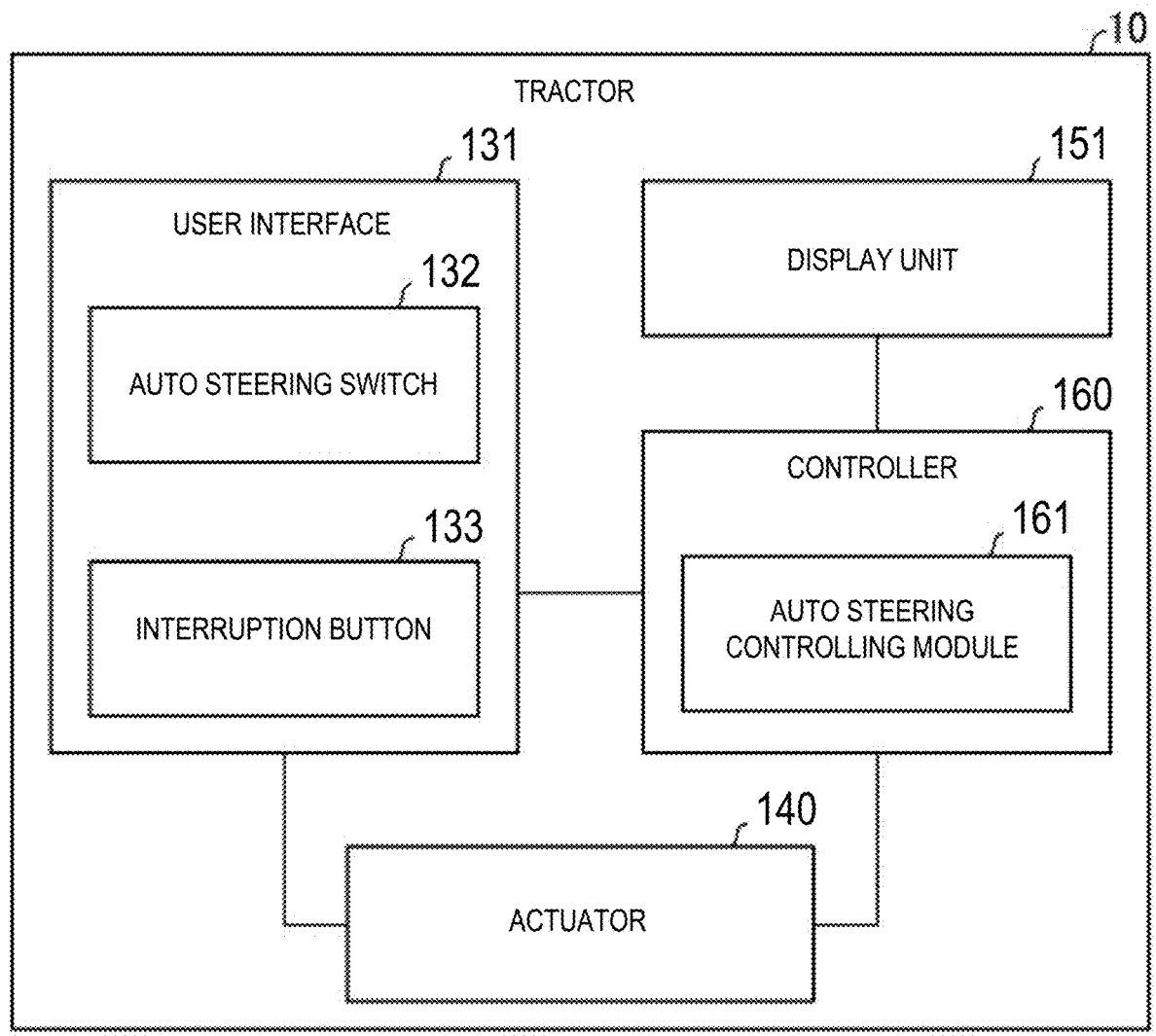
FIG. 9 is a functional block diagram of a tractor according to another example preferred embodiment of the present invention.

Below, another preferred embodiment of the present disclosure is described in detail. As illustrated in FIG. 9, the tractor 10 according to this preferred embodiment is a work vehicle provided with an auto steering function. In the auto steering function of the tractor 10, auto steering is executed by turning ON an auto steering switch 132, and the auto steering is canceled by performing a manual steering operation etc. However, in this preferred embodiment, even if the manual steering operation is performed during the auto steering, the auto steering is not completely canceled while an interruption button 133 is actuated, and the auto steering is again performed when the interruption button 133 is no longer actuated. Moreover, while the interruption button 133 is actuated, the tractor 10 can be steered by the manual steering operation.

Thus, even if the manual steering operation is performed during the execution of the auto steering, the auto steering is not always completely canceled, and therefore, the worker can cancel the auto steering as he/she intended.

Note that since the general functions of the tractor 10 as an agricultural machine are achievable by known arts, the description thereof is omitted herein. Moreover, although the tractor 10 is described as one example in this preferred embodiment, the present disclosure is applicable to various work vehicles, such as combines and rice transplanters.

Moreover, a coupling part including a three-point linkage etc. may be provided to a rear portion of the tractor 10, and the working device, such as the baler, may be detachably and movably attached to the tractor 10 through the coupling part. Moreover, the working device is not limited to the baler and it may be a tilling machine, a fertilizer distributor, a spray machine, a harvester, a reaper, etc.

Figure 11:
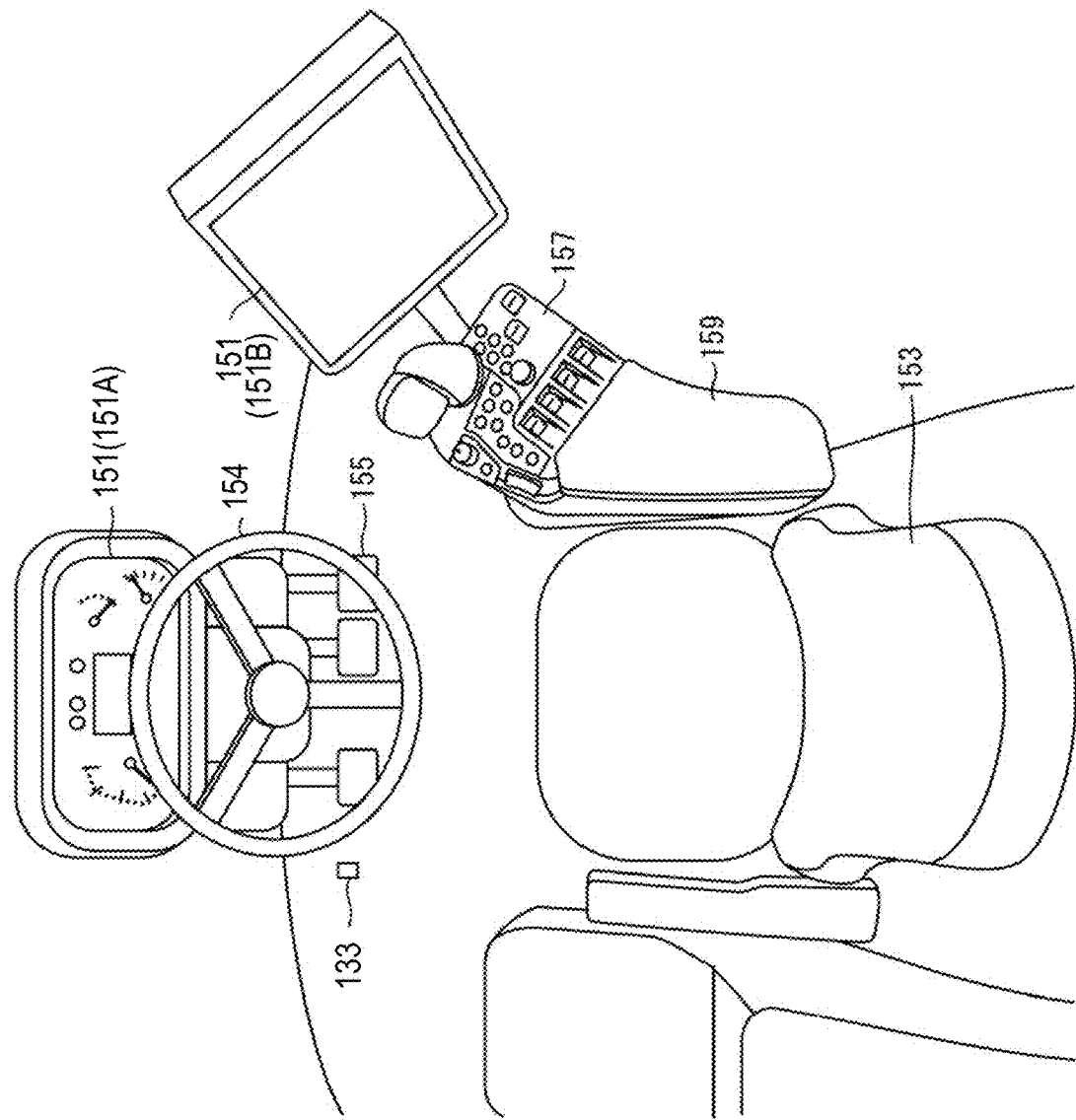
FIG. 11 is a view illustrating a driver's seat of the tractor when seen from rear.

FIG. 9 is a functional block diagram of the tractor 10. As illustrated in FIG. 9, the tractor 10 includes an auto steer user interface 131, the actuator 140, a tractor controller 160, and the display unit 151. The auto steer user interface 131 allows the worker to operate the tractor 10, and includes a steering wheel 154, pedals 155, such as an accelerator pedal and a brake pedal, and various control switches (control lever 157), as illustrated in FIG. 11. Moreover, the auto steer user interface 131 includes the auto steering switch 132 and the interruption button 133.

The auto steering switch 132 is a switch to execute the auto steering. After an engine startup, the auto steering can be executed by turning "ON" the auto steering switch 132. Note that the auto steering switch 132 may be displayed on the display unit 151 (described later) as an icon. In this case, by operating (e.g., tapping) the icon, the auto steering can be executed (ON) and canceled (OFF).

When the interruption button 133 is actuated while executing the auto steering, the auto steering is not completely canceled during the actuation, even if the manual steering operation is performed by the worker. In more detail, when the interruption button 133 is actuated while executing the auto steering, the worker is able to steer the tractor 10 by the manual steering operation, and when the interruption button 133 is no longer actuated, the tractor 10 returns to the scheduled traveling route set by the auto steering and the auto steering is continued.

Moreover, the interruption button 133 is in an "ON" state while being actuated by the worker, and on the other hand, it will be in an "OFF" state when the worker releases his/her finger.

To the scheduled traveling route, the tractor 10 may return by the shortest-distance path from a position at the timing of the interruption button 133 not being actuated, or it may return by the optimal path in consideration of the traveling direction.

Note that the auto steering is canceled when the manual steering operation is performed during the auto steering, without the interruption button 133 being actuated.

The actuator 140 is to propel the tractor 10 and includes a prime mover (an engine such as a diesel engine and a gasoline engine, an electric motor, etc.) and a transmission.

The tractor controller 160 performs various controls, such as a travel system and a work system of the tractor 10, and includes an auto steering controlling module 161 (a setting module, an executing module, a determining module).

The auto steering controlling module 161 performs setting and execution of the auto steering of the tractor 10. The auto steering controlling module 161 performs the auto steering when the auto steering switch 132 is turned ON. Moreover, when the interruption button 133 is actuated while executing the auto steering, the execution of the auto steering is suspended while the interruption button 133 is actuated, and when the actuation of the interruption button 133 is finished, the auto steering is resumed.

The auto steering controlling module 161 automatically controls the steering of the tractor 10 based on the scheduled traveling route setting. For example, the auto steering controlling module 161 controls the traveling direction of the tractor 10 so that the traveling position of the tractor 10 matches with the scheduled traveling route. That is, the traveling position of the tractor 10 is compared with the position indicated by the scheduled traveling route, and when the traveling position matches with the scheduled traveling route, the steering direction is maintained. On the other hand, when the traveling position does not match with the scheduled traveling route, the auto steering controlling module 161 controls the steering direction to control the traveling direction of the tractor 10 so that an amount of deviation of the traveling position from the scheduled traveling route becomes zero.

The display unit 151 is a display device disposed near the driver's seat, which displays various meters, and allows the worker to perform setting of the auto steering, etc. More than one display unit 151 may be provided. For example, as illustrated in FIG. 11, the meters may be installed in a dashboard meter 151A in front of the driver's seat, and the functions for setting the auto steering and controlling an implement may be separately installed in a terminal 151B (same as the terminal 150 in the previous preferred embodiment) on the right or left side of the driver's seat.

Figure 10:
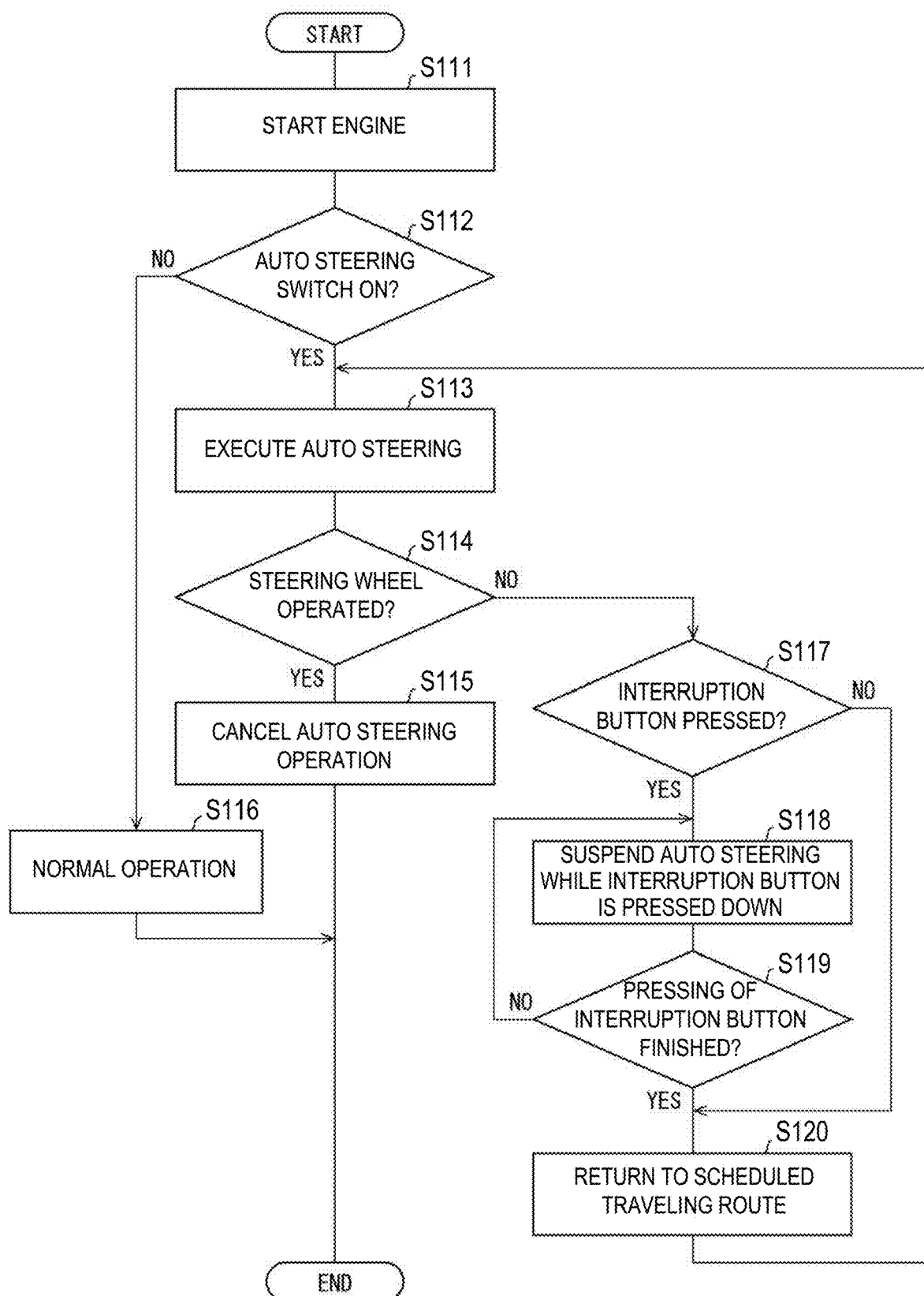
FIG. 10 is a flowchart illustrating a flow of processing in the tractor.

FIG. 10 is a flowchart illustrating a flow of processing in the tractor 10 when executing the auto steering.

As illustrated in FIG. 10, when the engine of the tractor 10 is started (S111) and the auto steering switch 132 is turned ON (YES at S112), the auto steering controlling module 161 executes the auto steering (S113). During the auto steering, before the steering wheel is manually operated (NO at S114), when the interruption button 133 is actuated (YES at S117), the auto steering controlling module 161 suspends the auto steering while the interruption button 133 is actuated (S118). Then, when the actuation of the interruption button 133 is finished (YES at S119), the auto steering controlling module 161 performs the control to bring the tractor 10 back to the scheduled traveling route (S120), and resumes the auto steering (S113).

FIG. 11 is a view illustrating the driver's seat of the tractor 10 seen from rear. As illustrated in FIG. 11, the driver's seat of the tractor 10 is provided with a seat 153 near the center, a steering wheel 154 forward of the seat 153, the dashboard meter 151A (display unit 151) which displays the meters, the pedals 155, such as the accelerator pedal and the brake pedal, at the worker's feet, a console box on the left side of the seat 153, an arm rest 159 on the right side of the seat 153, and the control lever 157. Moreover, the terminal 151B (display unit 151) which allow the worker to perform the setting of the auto steer of the tractor and the control of the implement is disposed forward of the control lever 157. Although the details will be described later, in this preferred embodiment, the interruption button 133 is provided to the steering wheel 154, a steering wheel spinner 156 attached to the steering wheel 154, or the arm rest 159. Note that the interruption button 133 may be displayed as an icon on the terminal 151B.

Figure 12:
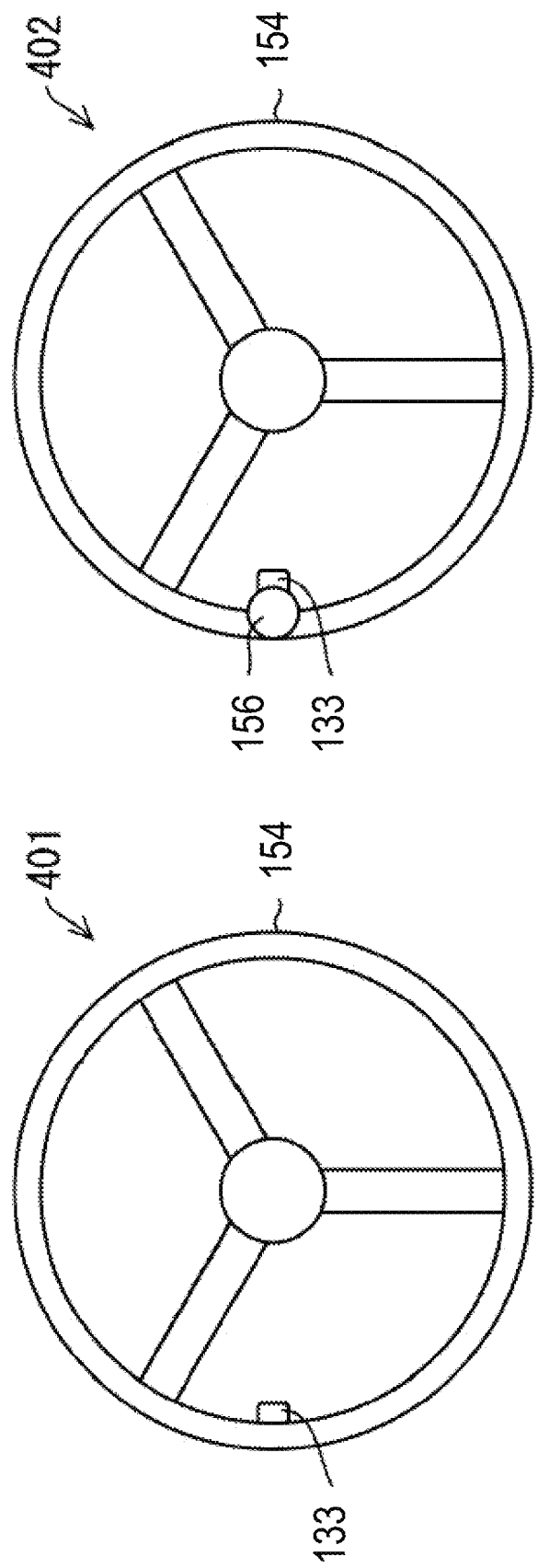
FIG. 12 is a view illustrating one example of arrangement of an interruption button.
Figure 13:
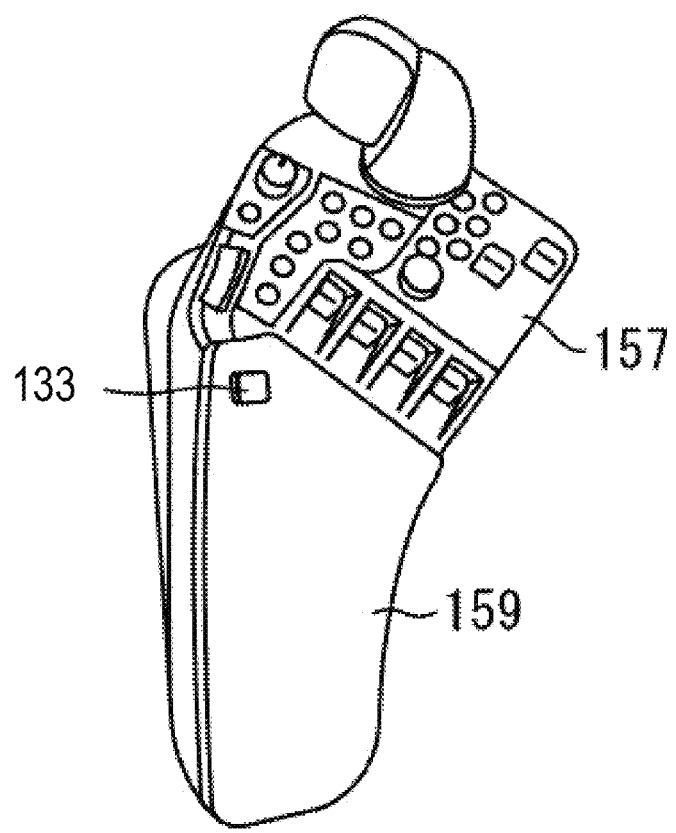
FIG. 13 is a view illustrating one example of arrangement of the interruption button.

FIGS. 12 and 13 are views illustrating layouts of the interruption button 133. In this preferred embodiment, as illustrated by 401 in FIG. 12, the interruption button 133 may be disposed at an inner portion of the steering wheel 154. By disposing the interruption button 133 at the inner portion of the steering wheel 154, it becomes easier to perform the steering operation, while actuating the interruption button 133. Moreover, when the worker wants to resume the auto steering, it becomes easier to remove the finger from the interruption button 133 to end the actuating. Moreover, it becomes possible to perform the steering operation and the actuating of the interruption button 133 with a single hand, thus improving the work efficiency of the worker.

Moreover, as illustrated by 402 in FIG. 12, the interruption button 133 may be disposed at the steering wheel spinner 156 provided to the steering wheel 154. By disposing the interruption button 133 at the steering wheel spinner 156, the worker can continue actuating the interruption button 133, while easily performing the steering operation with the single hand.

Alternatively, as illustrated in FIG. 13, the interruption button 133 may be disposed at a portion of the arm rest 159. By disposing the interruption button 133 at the portion of arm rest 159, the worker can securely actuate the interruption button 133 when the auto steering is suspended.

Further, as illustrated in FIG. 11, the interruption button 133 may be disposed at the worker's feet. Although the interruption button 133 is disposed at the worker's feet in FIG. 11, a pedal 155 for the interruption button 133 may be additionally provided.

Note that the disposed position of the interruption button 133 is not limited to the above position, and it may be disposed at other positions, as long as it is a position where the interruption button 133 is easily operated by the worker and the worker's steering operation is not impeded or affected.

Although in the above preferred embodiments the interruption button 133 is described as one example of interrupting or suspending the auto steering, it is not limited to the button and may be other elements, such as a switch, which can be turned "ON" and "OFF." That is, it may be of an alternate type in which "ON" and "OFF" are interchanged each time it is operated, without being limited to the type which becomes "OFF" when the worker removes his/her finger.

Figure 14:
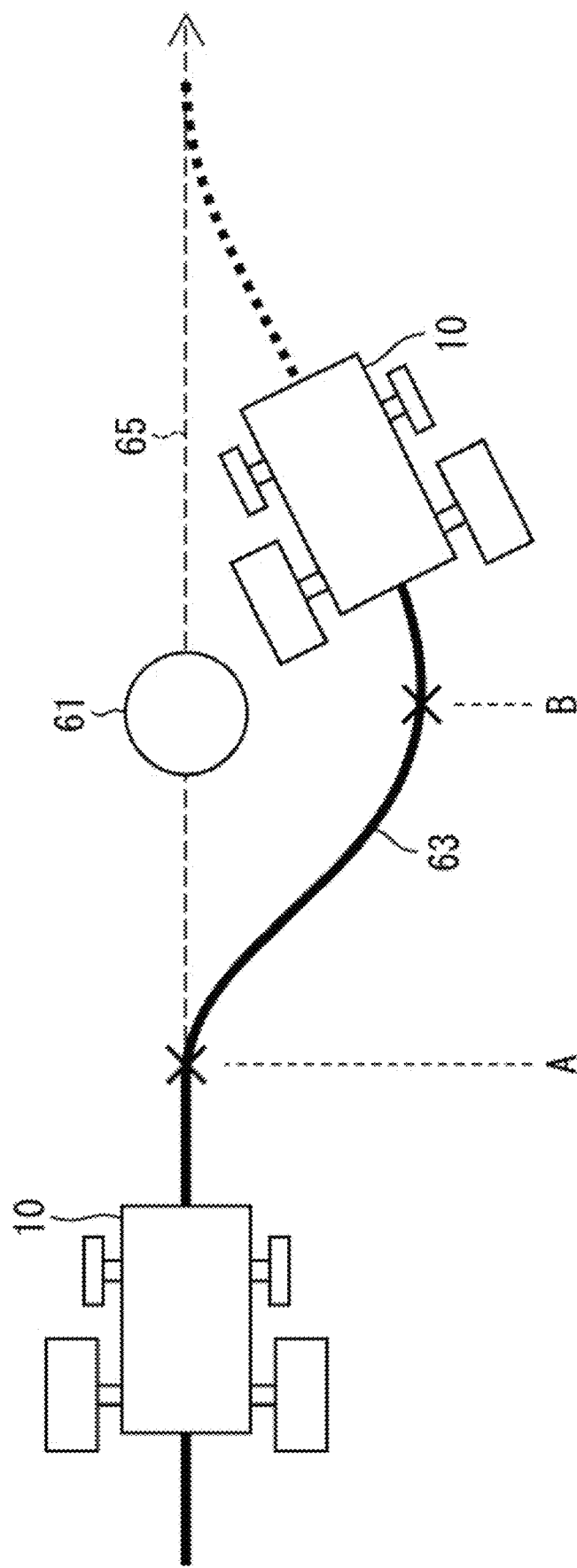
FIG. 14 is a view illustrating one example of traveling of the tractor when the interruption button is actuated while executing an auto steering.

FIG. 14 is a view illustrating a traveling path of the tractor 10 when the auto steering of the tractor 10 is executed, the interruption button 133 is actuated during the auto steering, and the actuation of the interruption button 133 is then ended.

As illustrated in FIG. 14, a scheduled traveling route 65 is set by using the auto steering, and the tractor 10 travels on the scheduled traveling route 65 according to the auto steering, from the left to the right in this figure.

Then, the worker discovers an obstacle 61 during traveling, and he/she then steers the tractor 10 to the right at Point A, while actuating the interruption button 133. In this case, the tractor 10 changes the path to the right based on the worker's steering operation, and travels on the traveling route 63 while avoiding the obstacle 61. Then, at Point B, when the actuation of an interruption button 133 is ended, the tractor 10 returns to the scheduled traveling route 65 through an optimal path, and resumes the auto steering.

The optimal path may be a path which connects the position of the tractor 10 and the scheduled traveling route 65 by the shortest distance, or may be derived from the traveling direction, the speed of the tractor 10, and an angle between the scheduled traveling route 65 and the traveling direction of the tractor 10. For example, when the obstacle 61 is not so large and the tractor 10 can avoid the obstacle 61 without being steered significantly, the tractor 10 can return to the scheduled path by the shortest route. On the other hand, when the obstacle 61 is large and a deviation from the scheduled traveling route 65 is large, the tractor 10 may roll over if the tractor 10 returns by the shortest route. In that case, the tractor 10 returns to the scheduled traveling route 65 at such an angle that the tractor 10 will not roll over. The returning condition to the scheduled traveling route 65 may be variously set by using the terminal 151B.

Thus, even in the situation where conventionally the auto steering is canceled and it must be set again, this preferred embodiment can prevent the cancelation of the auto steering which is not intended by the worker only with the easy operation of actuation of the interruption button 133.

This is effective when automatically creating the subsequently scheduled traveling path by referring to the previous path (i.e., currently traveling path). For example, when repeating a work for performing an agricultural work by a straight-line movement, and if there is the obstacle 61 at a certain location and a maneuver for avoiding the obstacle is taken, the tractor 10 may learn a portion parallel to the location as a curve and it may repeatedly perform a similar automatic traveling also for the subsequent route. On the other hand, in the present application, while the interruption button 133 is actuated, the tractor 10 can continue traveling straight for the subsequent path as the worker intended, if he/she sets the tractor 10 to ignore the obstacle 61 without learning.

The tractor controller 160 (auto steering controlling module 161) of the tractor 10 may be implemented, for example, by a logic circuit (hardware), such as an ECU (Electronic Control Unit) embodied in an integrated circuit (IC chip), or may be implemented by software.

In the latter case, the tractor controller 160 is provided with a computer which executes a command of a program which is software which achieves the functions. For example, this computer is provided with at least one processor (control device) and at least one computer-readable recording medium which stores the program described above. By the processor of the computer reading and executing the program from the recording medium, the purpose of the present disclosure is achieved. For example, a CPU (Central Processing Unit) may be used as the processor. For example, as the recording medium, "non-transitory tangible medium" such as a ROM (Read Only Memory), a tape, a disc, a card, a semiconductor memory, and a programmable logic circuit, may be used. In addition, a RAM (Random Access Memory) which develops the program may also be provided. Moreover, the program may be supplied to the computer via an arbitrary transmission medium (a communication network, a broadcast wave, etc.) which can transmit the program. Note that one mode of the present disclosure may also be implemented as a form of data signal embedded in a carrier wave, where the program is implemented by an electronic transmission.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine including an automatic steering function that causes the agricultural machine to automatically travel on a path, the agricultural machine comprising:
   a controller configured or programmed to define and function as:

a swath information acquiring module to acquire a position of a swath;

a first determining module to determine a traveling path of an automatic operation according to the automatic steering function based on the position of the swath;

an executing module to cause the agricultural machine to travel on the traveling path by the automatic operation according to the automatic steering function;

a traveling-footprint acquiring module to acquire an actually-traveled footprint in a first section up to a current time;

a setting module to set a work continuation width based on the traveling path; and a second determining module to determine, when there is a manual operation by a worker during the automatic operation, whether a position of the agricultural machine during the manual operation is within the work continuation width; wherein the executing module restores the agricultural machine to the traveling path after a termination of the manual operation and continues the automatic operation according to the automatic steering function, when the second determining module determines that the agricultural machine is within the work continuation width, and cancels the automatic steering function at a time when the second determining module determines that the agricultural machine is not within the work continuation width;

for every second section after the automatic operation is started, the first determining module determines a subsequent traveling path based on the actually-traveled footprint acquired by the traveling-footprint acquiring module;

the first determining module determines the traveling path by machine learning using a deep learning model; and the deep learning model outputs the actually-traveled footprint by using the actually-traveled footprint and a peripheral environment state in the first section as inputs.

2. The agricultural machine of claim 1, wherein the executing module restores the agricultural machine to the traveling path via a path determined based on at least any of a current position of the agricultural machine, a traveling direction of the agricultural machine, a distance between the agricultural machine and the traveling path, a resuming distance set in advance, and an angular velocity of a steering wheel during the manual operation.

3. The agricultural machine of claim 1, wherein the executing module cancels the automatic steering function when an angular velocity of a steering wheel during the manual operation is a predetermined value or more.

4. The agricultural machine of claim 1, wherein
the agricultural machine is communicable with a Farm Management Information System in which an external device performs a centralized control of information detected via sensors; and
the swath information acquiring module acquires, from the Farm Management Information System, the position of the swath based on information on a formation process of a target swath.

5. The agricultural machine of claim 1, wherein after a startup of the agricultural machine, the first determining module determines the traveling path based on information used to determine a previous traveling path before the startup of the agricultural machine.

6. An agricultural machine including an automatic steering function that causes the agricultural machine to automatically travel on a path, the agricultural machine comprising:
a controller configured or programmed to define and function as:
a swath information acquiring module to acquire a position of a swath;

a first determining module to determine a traveling path of an automatic operation according to the automatic steering function based on the position of the swath;

an executing module to cause the agricultural machine to travel on the traveling path by the automatic operation according to the automatic steering function;

a traveling-footprint acquiring module to acquire an actually-traveled footprint in a first section up to a current time;

a setting module to set a work continuation width based on the traveling path; and a second determining module to determine, when there is a manual operation by a worker during the automatic operation, whether a position of the agricultural machine during the manual operation is within the work continuation width; wherein the executing module restores the agricultural machine to the traveling path after a termination of the manual operation and continues the automatic operation according to the automatic steering function, when the second determining module determines that the agricultural machine is within the work continuation width, and cancels the automatic steering function at a time when the second determining module determines that the agricultural machine is not within the work continuation width;

for every second section after the automatic operation is started, the first determining module determines a subsequent traveling path based on the actually-traveled footprint acquired by the traveling-footprint acquiring module; and the first determining module approximates the actually-traveled footprint by a sine wave and determines the approximated sine-wave path as the traveling path.

7. The agricultural machine of claim 6, wherein the executing module restores the agricultural machine to the traveling path via a path determined based on at least any of a current position of the agricultural machine, a traveling direction of the agricultural machine, a distance between the agricultural machine and the traveling path, a resuming distance set in advance, and an angular velocity of a steering wheel during the manual operation.

8. The agricultural machine of claim 6, wherein the executing module cancels the automatic steering function when an angular velocity of a steering wheel during the manual operation is a predetermined value or more.

9. The agricultural machine of claim 6, wherein
the agricultural machine is communicable with a Farm Management Information System in which an external device performs a centralized control of information detected via sensors; and
the swath information acquiring module acquires, from the Farm Management Information System, the position of the swath based on information on a formation process of a target swath.

10. The agricultural machine of claim 6, wherein after a startup of the agricultural machine, the first determining module determines the traveling path based on information used to determine a previous traveling path before the startup of the agricultural machine.

\* \* \* \* \*